R. SWIMMER & E. B. NEELEN.
SAFETY COCK.
APPLICATION FILED MAY 28, 1908.
936,581.  Patented Oct. 12, 1909.
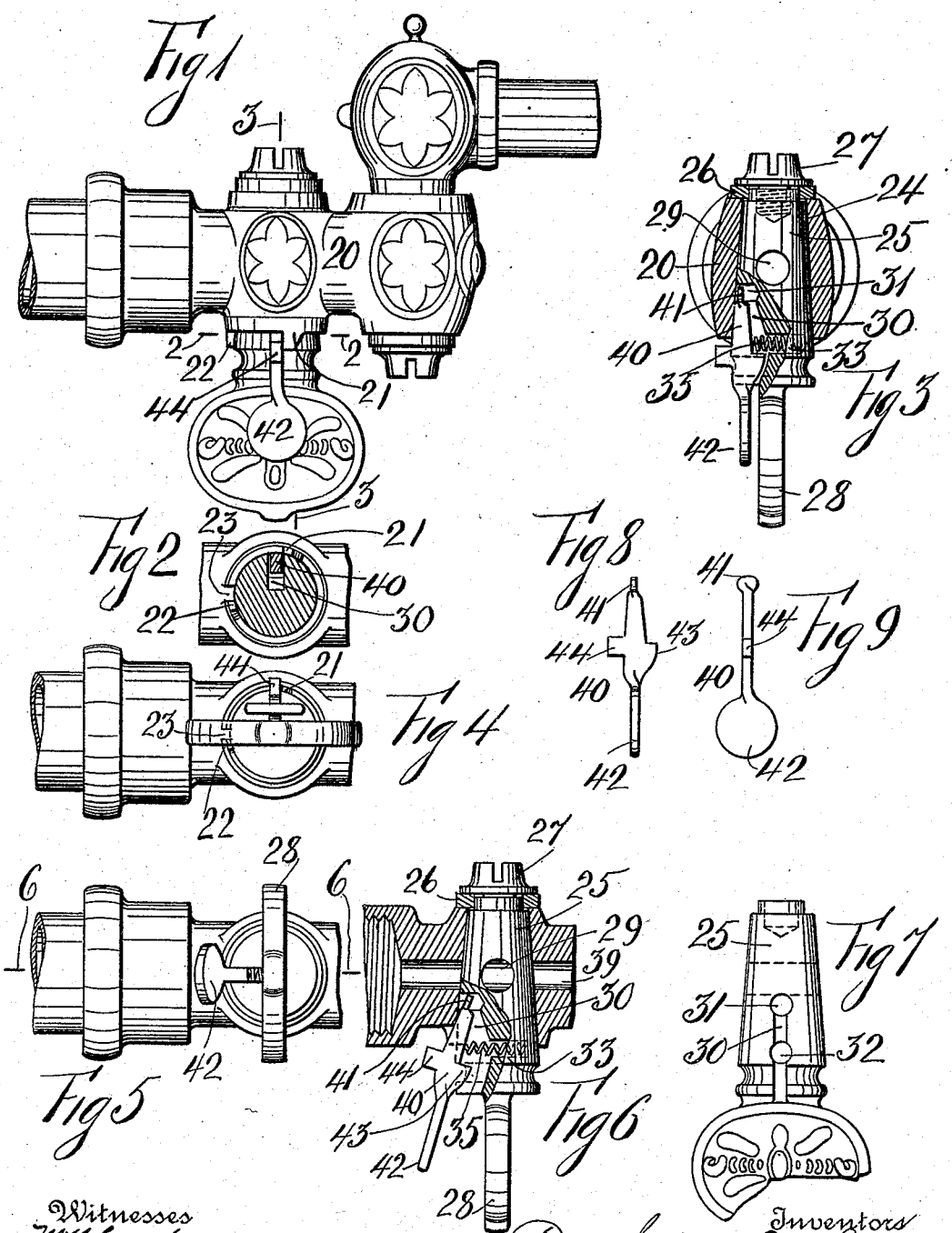

UNITED STATES PATENT OFFICE.

ROBERT SWIMMER, OF NEW YORK, N. Y., AND EDUARD B. NEELEN, OF LYNDHURST, NEW JERSEY.

SAFETY-COCK.

936,581. Specification of Letters Patent. Patented Oct. 12, 1909.

Application filed May 28, 1908. Serial No. 435,407.

*To all whom it may concern:*

Be it known that we, ROBERT SWIMMER and EDUARD B. NEELEN, citizens of the United States, and residents, respectively, of the borough of Manhattan, county of New York, State of New York, and Lyndhurst, county of Bergen, and State of New Jersey, have jointly invented certain new and useful Improvements in Safety-Cocks, of which the following is a specification.

This invention relates to safety cocks, and one of its specific objects is the production of a safety gas cock, which when closed can not be inadvertently opened.

The organization of the invention comprises a latch, which can be easily inserted in a slot formed in the plug valve of a cock, and which abuts against a shoulder of the valve casing when the plug valve is located in an open position, and is snapped into a slot formed in the valve casing when the plug valve is in a closed position.

One of the specific novelties of the invention is embraced in the construction of the latch which is not pinned to the plug valve as is ordinarily the case with the devices of this kind.

In the accompanying drawing, Figure 1 shows a front elevation of a gas cock with the invention incorporated therewith, Fig. 2 shows a partial bottom view and section of Fig. 1 on the line 2, 2, Fig. 3 is a section of Fig. 1 on the line 3, 3, Fig. 4 represents a partial bottom view of Fig. 1, Fig. 5 is a view similar to Fig. 4 with the plug valve turned 90 degrees, Fig. 6 shows a section of Fig. 5 on the line 6, 6, Fig. 7 represents a plan view of the plug, Fig. 8 shows a side view of the latch and Fig. 9 is a plan view thereof.

A valve casing 20 with the valve seat 24 is shown in the body of a gas pipe connection which is adapted at its ends to be coupled to other fittings as usual. At the lower edge of said casing are formed shoulders 21, 22 that span a quadrant of said edge, and adjacent to the shoulder 22 is formed a dent or cavity 23.

An ordinary plug valve 25 with an opening 29 is seated in the valve casing 20 and is held from longitudinal displacement by means of the washer 26 and screw 27. The plug valve 25 has formed therewith the flattened handle 28. A longitudinal slot 30 is formed in the plug valve which at its upper end is widened, preferably to a circular opening 31, while at its lower end is formed a circular opening 32, which latter joins with a cavity 33 extending below said slot. In the cavity 33 is placed a helical spring 35, and in the slot over said spring is located the latch 40.

The latch 40 has the flattened disk end 41 and the finger-piece 42, both of which are at right angles to the body of the latch. From the lower edge of the body of the latch extends the guide lug 43, which also constitutes a guide for the spring 35, and from the upper edge of said body extends the lug 44, which can abut against the edge of the shoulder 21. The lug 43 prevents any lateral displacement of the latch when it is in a raised position. When the latch is placed in position in the slot 30, the disk end 41 thereof is engaged in the circular opening 31 thereof, which prevents its dislodgment therefrom, and this construction obviates the use of any pins between the latch and the plug valve 25. When the latch is placed in the plug valve with its lower edge bearing on the spring 35, the cock is ready for operation, and when in the position shown in Figs. 1, 2, 3 and 4, the lug 44 bears against the shoulder 21 of the valve casing 20, and maintains the opening 29 in the plug valve 25, in alinement with the opening 39 through said casing to allow the gas or other fluid to pass through said openings. The plug valve cannot be turned any farther to the right, on account of the shoulder 21 acting as a stop for the latch 40 and consequently for said valve. To turn off the flow of gas or fluid the operator grasps the flattened handle 28 and turns it to the left until the body of the latch is brought against the shoulder 22, when the operator allows the latch to snap into the cavity 23. The latter position closes the passage through the valve casing. Next if it is desired to turn the valve to an open position the operator grasps both the handle 28 and finger piece 42, and turns the valve 90 degrees until the lug 44 is brought to bear against the shoulder 21. It will be noted that when the valve is turned from a closed, as shown in Figs. 5 and 6, to an open position as shown in Figs. 1 to 4, that the latch 40 must be disengaged from the cavity 23, and that it cannot be moved from said position without bearing on the finger piece 42, and turning the valve with the handle 28.

Having described our invention we claim:

1. In a safety cock the combination of a valve casing, a valve seat formed in the casing, a pair of shoulders formed at one edge of the casing, a plug valve bearing on the valve seat and having a longitudinal slot with a circular opening formed at each end of the slot and a cavity axially in line with one of said openings, a spring in said cavity, a latch in the slot bearing on said spring, a disk at one end of the latch engaging with the opening of the slot distant from said cavity.

2. In a safety cock the combination of a valve casing, a valve seat formed in the casing having a dent at one edge thereof, a pair of shoulders formed at said edge of the seat and spanning ninety degrees thereof, one of said shoulders forming a wall of the said dent, a plug valve bearing on the valve seat and having a longitudinal slot with a circular opening formed at each end thereof and a cavity axially in line with one of said openings, a spring in said cavity, a latch in the slot bearing on said spring, a disk end on the latch engaging with the opening of the slot distant from the said cavity, and a finger piece extending from the body of the latch.

3. In a safety cock the combination of a valve casing, a valve seat formed in the casing having a dent at one edge thereof, a pair of shoulders formed at said edge of the valve seat, a plug valve bearing on the valve seat and having a longitudinal slot with a circular opening formed at each end thereof and a cavity axially in line with one of said openings, a latch in the said slot, a lug extending from the upper edge of the latch to engage one of the shoulders of the valve casing when the valve is in an open position, a lug extending from the lower edge of the latch, a spring in the cavity of the plug valve guided by the lower lug of the latch, a disk end on the latch engaging with the circular opening of the slot distant from the cavity thereof, and a finger piece extending from the body of the latch.

In testimony whereof we affix our signatures in presence of two witnesses.

ROBERT SWIMMER.
EDUARD B. NEELEN.

Witnesses:
JOHN J. MILLIN,
MARTIN ZIMANSKY.